(12) United States Patent
Li et al.

(10) Patent No.: US 11,974,015 B2
(45) Date of Patent: Apr. 30, 2024

(54) MEDIA PROCESSING METHOD, DEVICE AND SYSTEM, AND READABLE STORAGE MEDIUM

(71) Applicant: ZTE CORPORATION, Guangdong (CN)

(72) Inventors: Qiuting Li, Guangdong (CN); Ping Wu, Guangdong (CN); Xiaoyang Ye, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/623,190

(22) PCT Filed: Jun. 23, 2020

(86) PCT No.: PCT/CN2020/097736
§ 371 (c)(1),
(2) Date: Dec. 27, 2021

(87) PCT Pub. No.: WO2020/259498
PCT Pub. Date: Dec. 30, 2020

(65) Prior Publication Data
US 2022/0360848 A1   Nov. 10, 2022

(30) Foreign Application Priority Data

Jun. 28, 2019   (CN) .......................... 201910580663.8

(51) Int. Cl.
*H04N 21/442* (2011.01)
*G06F 3/01* (2006.01)
(Continued)

(52) U.S. Cl.
CPC ....... *H04N 21/44218* (2013.01); *G06F 3/013* (2013.01); *H04N 21/21805* (2013.01);
(Continued)

(58) Field of Classification Search
None
See application file for complete search history.

(56) References Cited

U.S. PATENT DOCUMENTS 10,054,796 B2    8/2018   Bickerstaff et al.
2016/0342596 A1  11/2016  Aksu
(Continued)

FOREIGN PATENT DOCUMENTS

CN   105103034 A   11/2015
CN   109691094 A    4/2019
(Continued)

OTHER PUBLICATIONS

WIPO, International Search Report dated Sep. 2, 2020.
(Continued)

*Primary Examiner* — Junior O Mendoza
(74) *Attorney, Agent, or Firm* — Li & Cai Intellectual Property (USA) Office (57) ABSTRACT

Provided in embodiments of the disclosure are a media processing method, device and system, and the computer-readable storage medium. The media processing method includes: in a media file, describing position information and/or position change information of a user; and processing the media file to determine a video to be played. As such, by describing position information and/or position change information of a user in the media file, the video frame can be adjusted in real time according to the position of the user, thereby improving the quality of viewing by the user and improving user experience.

12 Claims, 3 Drawing Sheets

(51) Int. Cl.
*H04N 21/218* (2011.01)
*H04N 21/44* (2011.01)
*H04N 21/81* (2011.01)
*H04N 21/854* (2011.01)

(52) U.S. Cl.
CPC .......... *H04N 21/44* (2013.01); *H04N 21/816* (2013.01); *H04N 21/85406* (2013.01)

(56) References Cited

U.S. PATENT DOCUMENTS

| | | |
|---|---|---|
| 2018/0061002 A1 | 3/2018 | Lee et al. |
| 2018/0063505 A1 | 3/2018 | Lee et al. |
| 2018/0199042 A1 | 7/2018 | Wang et al. |
| 2020/0228775 A1* | 7/2020 | Sakai .................. H04N 21/438 |
| 2020/0389676 A1* | 12/2020 | Denoual ............ H04N 21/8456 |
| 2020/0413146 A1* | 12/2020 | Yin .................. H04N 21/85406 |

FOREIGN PATENT DOCUMENTS

| | | |
|---|---|---|
| CN | 110876051 A | 3/2020 |
| JP | 2007188283 A | 7/2007 |
| WO | WO 2019064853 A1 | 4/2019 |

OTHER PUBLICATIONS

European Patent Office, the extended European search report dated May 26, 2023, for corresponding EP application No. 20830754.6.

* cited by examiner

MEDIA PROCESSING METHOD, DEVICE AND SYSTEM, AND READABLE STORAGE MEDIUM

CROSS-REFERENCE TO RELATED APPLICATIONS

This application claims the priority of a Chinese patent application No 201910580663.8 filed with the China National Intellectual Property Administration on Jun. 28, 2019, titled "Media processing method, device and system, and readable storage medium" the entire content of which is incorporated into this application by reference.

TECHNICAL FIELD

The embodiments of the disclosure relate to, but are not limited to, the field of multimedia technologies, and in particular but not limited to a media processing method, device and system, and readable storage medium.

BACKGROUND

The VR (Virtual Reality) refers to a three-dimensional virtual world simulated by computer technologies, allowing a user to experience a highly realistic virtual space environment in the aspects of vision, hearing, touch and the like. With the rapid development of virtual reality technology, users can obtain deep immersive experience in a mobile manner.

A support of planar panoramic video experience is mainly provided at present, whereby a user wearing a head-mounted display device can view a 360-degree video through head rotation. For an enhanced three-degree-of-freedom (3DOF+) and a partial six-degree-of-freedom video, the user can move his or her head within a limited range to obtain more details.

However, if the displacement transformation occurs when the user is watching the panoramic video, the quality and the detail of the pictures the user is watching can be changed. Occluded or shadowed content, for example, can affect the viewing experience of the user. In view of the above problems, no relevant solution has been proposed to effectively solve the problem of video and video viewing of the user in the process of changing positions.

SUMMARY

In embodiments of the disclosure, the media processing method, device and system, and the computer-readable storage medium are provided to mainly solve the technical problems that the quality of pictures seen by a user is deteriorated when the user is watching a video due to displacement transformation and thus user experience is lowered.

To address the above technical problem, an embodiment of the present disclosure provides a media processing method, including: in a media file, describing position information and/or position change information of a user; and processing the media file to determine a video to be played.

An embodiment of the present disclosure further provides a media processing device, including: a position description module, configured to describe position information and/or position change information in a media file; and a video processing module, configured to process the media file to determine a video to be played.

An embodiment of the present disclosure further provides a media processing system, including: a media processor, a sensor, a display, and a communication bus, wherein is configured for connection communication among devices; and the media processor is configured to execute at least one computer program to control the sensor and the display to implement the operations of the media processing method as set forth above.

An embodiment of the present disclosure also provides a computer-readable storage medium, wherein the computer-readable storage medium stores at least one computer program which is executable by at least one processor to implement the operations of the media processing method as set forth above.

Additional features and corresponding advantages of the disclosure will be set forth in the description below. It should be understood that at least some of the advantages will become apparent from the description in this disclosure.

DETAIL DESCRIPTION OF EMBODIMENTS

In order to make the objects, technical solutions and advantages of the disclosure more clearly understood, the detailed description of the embodiments of the present disclosure is made hereinafter with reference to the accompanying drawings. It should be understood that the specific embodiments described herein are merely illustrative and are not intended to limit the disclosure.

First Embodiment

Figure 1:
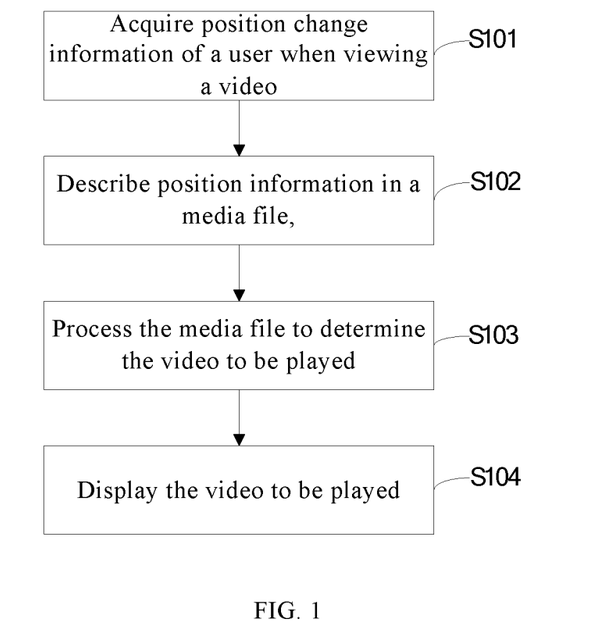
FIG. 1 is a flowchart illustrating a media processing method according to a first embodiment of the disclosure.

This embodiment provides a media processing method. With reference to FIG. 1, the method includes:

S101, acquiring position change information of a user when viewing a video;

S102, in a media file, describing position information and/or position change information of the user;

S103, processing the media file to determine a video to be played (broadcasted); and S104, displaying the video to be played (broadcasted).

For the video to be played, the processing mode thereof is that a media file is subjected to coding/decoding processing according to the media file to obtain the video which can be directly watched by the naked eyes of a user; in the process of coding/decoding, the media file can be adjusted to have different display effects according to parameters of different playing equipment, different environmental conditions and the like.

In this embodiment, before describing the position information and/or position change information of the user, the method further includes: periodically acquiring the position information of the user. The position information of the user can be obtained in an inside-out mode and an outside-in mode. For example, in the inside-out mode, a sensor for positioning is arranged in the virtual reality headset to detect the movement of the user, and in the outside-in mode, the video of the user is collected through a camera to determine the position information of the user. The main focus of the user position change is the sight line change of the user, that is, the position of the user's gaze on the video. The user's sight line is of a range that is progressively blurred away from the center of sight until completely hidden from view. Therefore, it is important to determine the displayed content at the center of the user's sight line. The determination of the position information and/or position change information of the user when viewing video can be used to further determine information in relation to the sight line of the user.

In some embodiments, the position information can include at least one of a viewing position and a viewing direction of the user, and accordingly the position change information can include at least one of change information of the viewing position and change information of the viewing direction of the user; wherein the viewing position includes a coordinate point position of the user in the global coordinate system and/or a position of the user determined by a positioning system. The change information of the viewing position, i.e., the displacement of the user in a room, can include two cases depending on the reference frame. The first case includes: a coordinate point such as (x, y, z) obtained in the global coordinate system of a current VR scene according to the position change of the user; the second case includes: the position information divided by the existing global positioning systems including longitude and latitude, and altitude information, and the displacement determined by positioning systems such as a GPS and a Beidou.

In addition, the viewing direction can then include a position of a user's viewpoint in the global coordinate system. The user's viewpoint can further determine the user's sight line, and the user's sight line direction should be a cone relative to the user's eyes, i.e., a cone extending outward from the user's eyes, and the cone has a corresponding pattern or function graph in the coordinate system. Along with a trigger condition such as a change of spatial position of the user, a rotation of head, and a rotation of pupil, the sight line direction of the user can be correspondingly changed.

In the media file, the description of the position information and/or the position change information means that the content related to the position of the user is contained in the media file, that is, the information relating to the position information and/or the position change information is directly written into the media file, whereby the playback of the videos can be controlled more directly and the efficiency and the accuracy of the control can be improved.

In some embodiments, prior to describing the position information and/or position change information of the user, the method can further include: periodically acquiring the position information of the user.

In order to obtain the position information of the user, a periodic sampling mode is adopted to obtain the position of the user in real time; in this way, the real-time performance of video adjustment can be ensured, and the watching quality of a user can be improved.

In some embodiments, media sampling included in the media track in the media file corresponds to the position information and/or position change information of the user; the position change information can then be determined according to the user's position information in the media sample. The media sample can reflect the user's position information. The position information can further determine the position change information of the user, whereby the variance between the current picture and the picture before the position of the user is changed can be determined.

In some embodiments, the position information of the user corresponding to the media sampling included in the media track in the media file can include: the position information of the user in any period described according to timed metadata of user position tracing, which represents the position information of the user corresponding to the media sampling in the period.

In some embodiments, the position change information of the user corresponding to the media sampling included in the media track in the media file can include: a difference between a current position of the user and a previous position of the user described according to timed metadata of user position change, which represents the position change information of the user corresponding to the media sampling in the period.

In some embodiments, the position information of the user corresponding to each media sampling can be represented according to a position trace data box in sample table data boxes.

In some embodiments, the position change information of the user corresponding to each media sampling can be represented according to a position change data box in the sample table data boxes.

In some embodiments, the operation of processing the media file and determining the video to be played can include: determining a current position of the user according to the position information and/or position change information of the user; and reconstructing/rendering the video to be played according to the current position of the user.

The reconstruction is to change the composition (structure) of a video, or redraw the video; the rendering is to adjust the color tones of the filter on the video, which can modify shadows that may appear due to the change of the position of the user without changing the structure of the video.

In some embodiments, after reconstructing/rendering the video to be played according to the user position, the method can further include: describing the reconstructed/rendered video to be played according to a media file format.

The description herein is for the next adjustment, that is, after the description of the video, the subsequent continued playback can be performed according to the description. If the user changes the position again, the current media file is used for adjustment. Correspondingly, after the video to be played is reconstructed/rendered, the adjusted user position can be described in addition to the description of the reconstructed/rendered video to be played, whereby user's motions can be recorded for subsequent learning and readjustment.

According to the media processing method in this embodiment, in a media file, the position information and/or position change information of a user is described; and the media file is processed to determine the video to be played. Therefore, by describing the position information and/or position change information of the user in the media file, the video can be adjusted in real time according to the position of the user, the watching quality of the user is improved, and the user experience is guaranteed.

Second Embodiment

Figure 2:
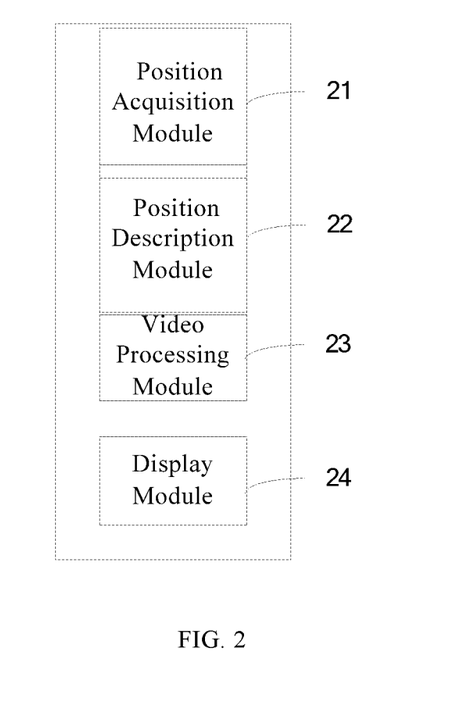
FIG. 2 is a block diagram illustrating a composition of a media processing device according to a second embodiment of the disclosure.

In this embodiment, there is provided a media processing device. With reference to FIG. 2, the device includes:
a position acquisition module 21, configured to acquire position change information of a user when viewing a video;

a position description module 22, configured to describe the position change information in a media file;

a video processing module 23, configured to process the media file to determine a video to be played; and a display module 24, configured to display the video to be played.

In this embodiment, before describing the position information and/or the position change information of the user, the position acquisition module 21 is further configured to periodically acquire the position information of the user. The position information of the user can be obtained in an inside-out mode and an outside-in mode. For example, in the inside-out mode, a sensor for positioning is arranged in the virtual reality headset to detect the movement of the user, and in the outside-in mode, the video of the user is collected through a camera to determine the position information of the user. The main focus of the user position change is the sight line change of the user, that is, the position of the user's gaze on the video. The user's sight line is of a range that is progressively blurred away from the center of sight until completely hidden from view. Therefore, it is important to determine the displayed content at the center of the user's sight line. The determination of the position information and/or position change information of the user when viewing video can be used to further determine information in relation to the sight line of the user.

In some embodiments, the position information can include at least one of a viewing position and a viewing direction of the user, and accordingly the position change information can include at least one of change information of the viewing position and change information of the viewing direction of the user; wherein the viewing position includes a coordinate point position of the user in the global coordinate system and/or a position of the user determined by the positioning system. The change information of the viewing position, i.e., the displacement of the user in a room, can include two cases depending on the reference frame. The first case includes: a coordinate point such as (x, y, z) obtained in the global coordinate system of a current VR scene according to the position change of the user; the second case includes: the position information divided by the existing global positioning systems including longitude and latitude, and altitude information, and the displacement determined by positioning systems such as a GPS and a Beidou.

In addition, the viewing direction can then include a position of a user's viewpoint in the global coordinate system. The user's viewpoint can further determine the user's sight line, and the user's sight line direction should be a cone relative to the user's eyes, i.e., a cone extending outward from the user's eyes, and the cone has a corresponding pattern or function graph in the coordinate system. Along with a trigger condition such as a change of spatial position of the user, a rotation of head, and a rotation of pupil, the sight line direction of the user can be correspondingly changed.

In the media file, the description of the position information and/or the position change information means that the content related to the position of the user is contained in the media file, that is, the information relating to the position information and/or the position change information is directly written into the media file, whereby the playback of the videos can be controlled more directly and the efficiency and the accuracy of the control can be improved.

In some embodiments, before position description module 22 describes the position information and/or position change information of the user, position acquisition module 21 is further configured to periodically acquire the position information of the user.

In order to obtain the position information of the user, a periodic sampling mode is adopted to obtain the position of the user in real time; in this way, the real-time performance of video adjustment can be ensured, and the watching quality of a user can be improved.

In some embodiments, the media sampling included in the media track in the media file corresponds to position information and/or position change information of the user; the position change information can then be determined according to the user's position information in the media sample. The media sample can reflect the user's position information. The position information can further determine the position change information of the user, whereby the variance between the current picture and the picture before the position of the user is changed can be determined.

In some embodiments, the position information of the user corresponding to the media sampling included in the media track in the media file can include: the position information of the user in any period described according to timed metadata of user position tracing, which represents the position information of the user corresponding to the media sampling in the period.

In some embodiments, the position change information of the user corresponding to the media sampling included in the media track in the media file can include: the difference between the current position of the user and the previous position of the user described according to timed metadata of user position change, which represents the position change information of the user corresponding to the media sample in the period.

In some embodiments, the position information of the user corresponding to each media sampling can be represented according to a position track box in sample table data boxes.

In some embodiments, the position change information of the user corresponding to each media sampling can be represented according to a position change data box in the sample table data boxes.

In some embodiments, the video processing module 23 can be further configured to: determines a current position of the user according to the position information and/or position change information of the user; and reconstruct/render the video to be played according to the current position of the user.

The reconstruction is to change the composition (structure) of a video, or redraw the video; the rendering is to adjust the color tones of the filter on the video, which can modify shadows that may appear due to the change of the position of the user without changing the structure of the video.

In some embodiments, after the video processing module 23 reconstructs/renders the video to be played according to the user position, the position description module 22 can be further configured to describe the reconstructed/rendered video to be played according to a media file format.

The description herein is for the next adjustment, that is, after the description of the video, the subsequent continued playback can be performed according to the description. If the user changes the position again, the current media file is used for adjustment. Correspondingly, after the video to be played is reconstructed/rendered, the adjusted user position can be described in addition to the description of the reconstructed/rendered video to be played, whereby user's motions can be recorded for subsequent learning and readjustment.

According to the media processing device in this embodiment, in a media file, the position information and/or position change information of a user is described; and the media file is processed to determine the video to be played. Therefore, by describing the position information and/or position change information of the user in the media file, the video can be adjusted in real time according to the position of the user, the watching quality of the user is improved, and the user experience is guaranteed.

Third Embodiment

Figure 3:
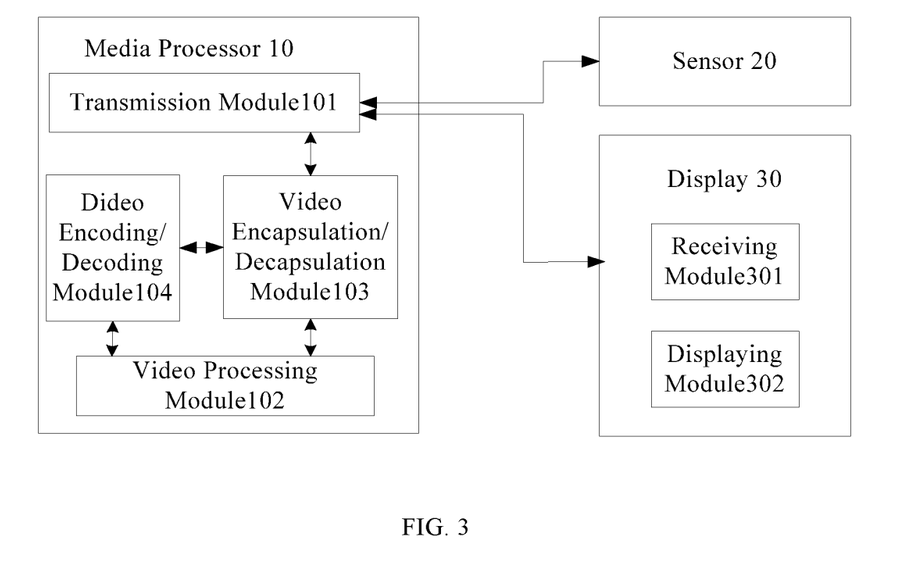
FIG. 3 is a block diagram illustrating a composition of a media processing system according to a third embodiment of the disclosure.
Figure 4:
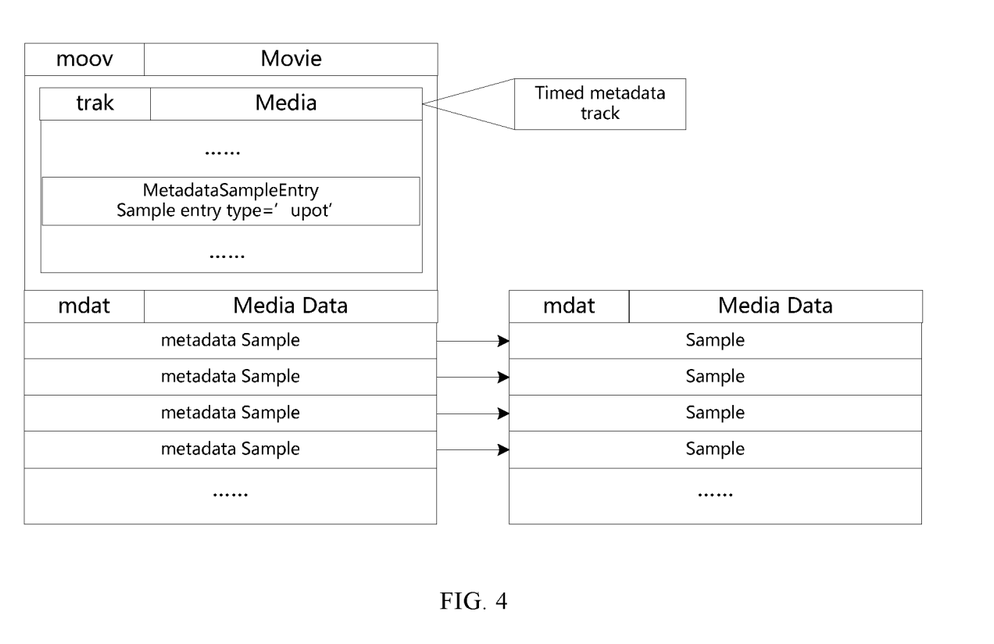
FIG. 4 is a schematic diagram of timed metadata of user position tracing according to the third embodiment of the disclosure.
Figure 5:
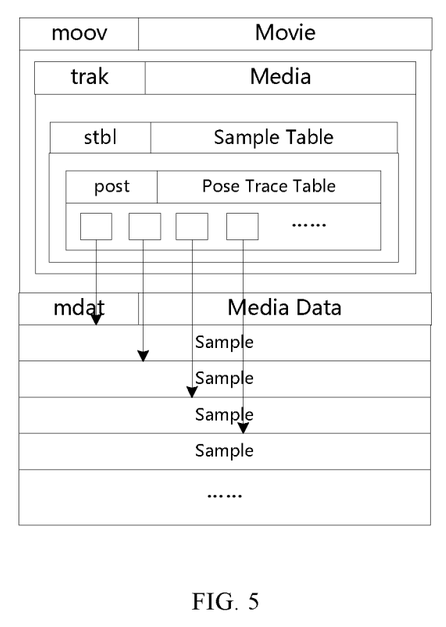
FIG. 5 is a schematic diagram of a data box of user position tracing according to the third embodiment of the disclosure.

In this embodiment, there is provided a media processing system with reference to FIGS. 3 to 5. As shown in FIG. 3, the system includes a media processor 10, a sensor 20, a display 30, and a communication bus 40, wherein the communication bus 40 is configured for connection communication among devices, the media processor 10 is configured to execute one or more computer programs to control the sensor 20 and the display 30 to implement the operations of the media processing method in the embodiments as described above.

The media processor includes a transmission module 101, a video processing module 102, a video encapsulation/decapsulation module 103, and a video encoding/decoding module 104. The structure shown in FIG. 3 is only for the purpose of illustration and does not limit the structure of the system. For example, the sensor 20 and display 30 can be combined into one piece, and the media processor can include more or fewer components than shown in FIG. 3.

The transmission module 101 is configured to receive or transmit a video file, and receive sensor acquisition data. The above-mentioned receipt or transmission can be implemented by a wireless network provided by a communication provider, a locally established wireless local area network, or a wired manner.

The video processing module 102 is configured to select the video file in a certain area (i.e., a window area of a user) according to the user data collected by the sensor received by the transmission module 101, and perform rendering processing on a decoded video.

The video encapsulation/decapsulation module 103 is configured to decapsulate a video file to be processed by the video processing module 102, or encapsulator a video file processed by the video processing module 102.

The video encoding/decoding module 104 is configured to decode the video decapsulated by the video encapsulation/decapsulation module 103, or encode and compress the video file encapsulated by the video encapsulation/decapsulation module 103.

The display 30 at least includes a receiving module 301 and a displaying module 302, wherein the receiving module 301 is configured to receive the media file sent from the media processor, and the displaying module 302 is configured to display the received media file.

It should be noted that, in this embodiment, one implementation is to store omnidirectional video data in a file based on an ISO (International Organization for Standardization) basic media file format.

All data in the ISO base file format is contained in boxes (Box). In other words, the ISO base file format represented by MP4 files is composed of a number of boxes, each of which has a type and a length and can be regarded as a data object. A box that can contain another box is referred to as a container box. An MP4 file will first have, and only have, a box of the "ftyp" type, which acts as a flag of the file format and contains some information about the file. There will then be and only one box of "MOV" type (Movie Box), which is a container box and a sub-box of which contains metadata information for the media. The Media Data of an MP4 file is contained in a box of "mdat" type (Media Data Box), which is also a container box and which may be plural or may be absent (when the Media Data all refer to other files). The structure of the Media Data is described by metadata.

Again, a timed metadata track is a mechanism in the ISO basic media file format (ISOBMFF) to establish the timed metadata associated with a particular sample.

In some embodiments, the user feeds back the position change in real time, and the viewing position and the viewing direction of the user corresponding to each sample are determined according to the timed metadata track of user position tracing.

In some embodiments, the timed metadata track of user position tracing is identified according to a sample entry type. The timed metadata track of user position tracing is used for indicating position information when viewing its corresponding video track.

In particular, the metadata of user position tracing indicates information of a changing user position. The purpose of the metadata track of user position tracing is indicated by a track sample entry type. Specifically, the sample entry type is 'upot', which is defined by:

```
UserPoseTraceSampleEntry extends MetaDataSampleEntry ('upot') {
    string position _ provider;
    UserPositionBox ( )
}
class User PositionBox extends Fullbox ('upst', 0,0)' {
    unsigned int (1) dynamic_position_flag;
    if (dynamic_position_flag = = 0) {
        viewpointPosStruct ( );
        viewpointRotationStruct ( );
    }.
```

The position_provider indicates a user position provider, which may be a user's feedback or a director's designation.

The dynamic_position_flag, when taking a value of 0, indicates that user positions of all samples in the sample entry are fixed, and when taking a value of 1, indicates that user position information corresponding to each sample of the sample entry is represented in a sample format.

The viewpointPosStruct( ) indicates an initial position of user, with reference to the user position structure syntax definition in the example.

The viewpointRotationStruct( ) indicates e a rotation angle of the user viewpoint along the X, Y, Z axes of the global coordinate system, with reference to the viewpoint rotation structure in the example.

Hereinafter, the sample format of timed metadata track of user position tracing will be described in conjunction with an optional embodiment, indicating user position information corresponding to each sample.

```
aligned (8) UserPoseTraceSample( ) {
    viewpointPosStruct( );
    unsigned int (1) rotation_flag;
    if (rotation_flag) {
        viewpointRotationStruct ( );
    }
}
```

The rotation_flag, when equal to 1, indicates the presence of a rotation angle of X, Y and Z axes of the viewpoint in the global coordinate system with respect to coordinate axes in a local coordinate system, and when equal to 0, indicates the absence thereof.

The timed metadata track of user position tracing can reference track identification of at least one video tracks by referencing Track Reference Box having a type of 'cdsc'.

The user position tracing is described by the viewing position and the viewing direction of the user, and the viewing position and the viewing direction of the user are represented by viewpoint information of the user in the panoramic video. The viewpoint information includes at least one of:
- a 3D spatial position of a viewpoint including: an X-axis coordinate, a Y-axis coordinate, and a Z-axis coordinate of the viewpoint;
- a GPS position of a viewpoint including: a longitude coordinate, a latitude coordinate, and an altitude coordinate of the viewpoint; or
- a rotation direction of a viewpoint in the global coordinate system, including: a yaw angle, a pitch angle and a roll angle of the viewpoint in X, Y, Z axes of the global coordinate system relative to the local coordinate system.

The viewpoint information of the user includes a position structure and a direction structure of a viewpoint of the user. The position structure of the viewpoint is defined by

```
aligned (8) viewpointPosStruct ( ) {
    signed int (32) pos_x;
    signed int (32) pos_y;
    signed int (32) pos_z;
    unsigned int (1) gpspos_present_flag;
    bit (31) reserved = 0;
    if (gpspos_present_flag) {
        signed int (32) gpspos_longtude;
        signed int (32) gpspos_latitude;
        signed int (32) gpspos_altitude;
    }
}
```

The direction structure of the viewpoint is defined by

```
aligned (8) class ViewpointRotationStruct( ) {
    signed int (32) rotation_yaw;
    signed int (32) rotation_pitch;
    signal int (32) rotation_roll;
}
```

The specific semantics will be discussed as follows.

The pos_x, pos_y, and pos_z indicate cartesian coordinate values of a 3D spatial position of a viewpoint in a global reference coordinate system centered at (0, 0, 0).

The gpspos_present_flag indicates whether there is a flag bit of the GPS position of the viewpoint. When equal to 1, it indicates the presence of the GPS position of the viewpoint and when equal to 0, indicates the absence of the GPS position of the viewpoint.

The gpspos_longitude, gpspos_latitude and gpspos_altitude indicate the longitude, latitude and altitude coordinates of the GPS position of viewpoint, respectively.

The rotation_yaw, rotation_pitch and rotation_roll indicate the yaw angle, pitch angle and roll angle of the viewpoint rotating along X, Y and Z axes, respectively, i.e., a transformation from the local coordinate axis of the user viewpoint to the global coordinate axis.

In some embodiments, the user position change between samples can be represented according to a change amount of user's first position and second position.

In some embodiments, the user position change is represented according to a position change amount of the user in a certain period (such as a period between two samples), and the change information of the viewing position and the viewing direction of the user corresponding to each sample is determined according to the timed metadata track of the user position change.

In some embodiments, the timed metadata track of the user position change is identified according to a sample entry type, wherein the timed metadata track of the user position change is configured to indicate a position change when viewing its corresponding video track.

Specifically, the user position change metadata indicates information of the user position change. The purpose of the user position change metadata track is specified by the track sample entry type. Specifically, the sample entry type is 'upot', defined by:

```
UserPoseDifferenceSampleEntry extends MetaDataSampleEntry ('upot') {
    string pose_ provider;
    PoseDifenceBox ( );
}
class PoseDifferenceBox extends Fullbox ('upst', 0,0) {
    unsigned int (1) dynamic_position_flag;
    if (dynamic_position_flag = = 0) {
    viewpointPosStruct ( );
    viewpointRotationStruct ( );
}.
```

The pose_provider indicates a provider of the user's viewing position, and may be the user's own feedback or director's designation.

The dynamic_position_flag, when taking a value of 0, indicates that user positions of all samples in the sample entry are unchanged, and when taking a value of 1, indicates that user position information corresponding to each sample of the sample entry is represented in a sample format.

The viewpointPosStruct( ) indicates an initial position of user, with reference to the user position structure syntax definition in the example.

The viewpointRotationStruct( ) indicates a rotation angle of the user viewpoint along the X, Y, Z axes of the global coordinate system, with reference to the viewpoint rotation structure of the global coordinate system in the example.

Hereinafter, the sample format of the timed metadata track of user position change will be described in conjunction with an optional embodiment, indicating position change information corresponding to each sample.

```
aligned (8) UserPoseDifferenceSample ( ) {
    unsigned int (1) pose_flag;
    if (pose_flag) {
        signed int (32) pos_difference_x;
        signed int (32) pos_difference_y;
        signed int (32) pos_difference_z;
    }
    unsigned int (1) rotation_flag;
    if (rotation_flag) {
    viewpointRotationStruct ( );
    }
}
```

The specific semantics are defined as follows.

The pose_flag, when taking a value of 0, indicates that the user position does not cause a change in the viewing position during the two samples; and when taking a value of 1, indicates that a change in the user position causes a change in the viewing position during the two samples.

The pos_difference_x, pos_difference_y, and pos_difference_z indicate a difference in positional change of viewpoints in the 3D space caused by the change in user position in a common reference coordinate system centered at (0, 0, 0).

The rotation_flag, when equal to 1, indicates the presence of a rotation angle of X, Y and Z axes of the viewpoint in the global coordinate system with respect to coordinate axes in the common reference coordinate system, and when equal to 0, indicates the absence thereof.

Optionally, each media sampling is listed and described by the position tracing data box (PoseTraceBox) of the user; and the position tracing data box (PoseTraceBox) will be described below in connection with an optional implementation.

Box Type: 'post'
Container: SampleTableBox
Mandatory: No
Quantity: Zero or one

```
Syntax
    aligned(8) class PoseTraceBox extends FullBox ('post', 0, 0) {
        int i;
        for (i =0; i < sample_count; i + +) {
            ViewpointPosStruct ( );
            unsigned int (1) rotation_flag;
            if (rotation_flag) {
                viewpointRotationStruct ( );
            }
        }
    }
```

The sample count indicates the number of consecutive samples during a certain time period.

Optionally, each media sampling is listed and described by a data box representing a user position change; the position change data box (PoseChangeBox) will be described below in connection with an optional implementation.

Box Type: 'posc'
Container: SampleTableBox
Mandatory: No
Quantity: Zero or one

```
Syntax
    aligned (8) class PoseChangeBox extends FullBox ('post', 0, 0) {
        int i;
        for (i=0; i < sample_count; i + +) {
            unsigned int (1) pose_flag;
            if (pose_flag) {
                signed int (32) pos_difference_x;
                signal int (32) pos_difference_y;
                signed int (32) pos_difference_z;
            }
            unsigned int (1) rotation_flag;
            if (rotation_flag) {
                viewpointRotationStruct ( );
            }
        }
    }
```

The sample count indicates the number of consecutive samples during a certain time period.

In an embodiment, there is also provided a computer-readable storage medium including volatile or non-volatile, removable or non-removable media implemented in any method or technology for storage of information (such as computer-readable instructions, data structures, computer program modules or other data). The Computer-readable storage medium includes, but are not limited to, RAM (Random Access Memory), ROM (Read-Only Memory), EEPROM (Electrically Erasable Programmable Read-Only Memory), flash Memory or other Memory technologies, CD-ROM (Compact disk Read-Only Memory), Digital Versatile Disks (DVD) or other optical disk storages, magnetic cassettes, magnetic tape, magnetic disk storage or other magnetic storage systems, or any other medium which can be used to store desired information and which can be accessed by a computer.

The computer-readable storage medium in this embodiment can be used to store one or more computer programs, and the stored one or more computer programs can be executed by a processor to implement at least one operation of the media processing method in the above embodiments.

In an embodiment, there is also provided a computer program (or computer software), which can be distributed on a computer-readable medium and which can be executed by a computing system to implement at least one operation of the media processing method in the above embodiments.

In an embodiments also provided a computer program product including a computer-readable system having a computer program as shown above stored thereon.

The computer-readable system in this embodiment can include a computer-readable storage medium as shown above.

It should be appreciated by those skilled in the art that all or some of the operations of the methods, systems, functional modules/units in the systems disclosed above can be implemented as software (which can be implemented as computer program code executable by a computing system), firmware, hardware, and suitable combinations thereof. In a hardware implementation, the division between functional modules/units mentioned in the above description does not necessarily correspond to the division of physical components; for example, one physical component can have multiple functions, or one function or operation can be performed by several physical components in cooperation. Some or all of the physical components can be implemented as software executed by a processor, such as a central processing unit, digital signal processor, or microprocessor, or can be implemented as hardware, or can be implemented as an integrated circuit, such as an application specific integrated circuit.

In addition, as is well known to those having ordinary skill in the art, communication media typically embodies computer readable instructions, data structures, computer program modules or other data in a modulated data signal such as a carrier wave or other transport mechanism and includes any information delivery media. Thus, the present disclosure is not limited to any specific combination of hardware and software.

Discussed above is a more detailed description of the embodiments of the present disclosure, taken in conjunction with the specific implementations thereof, and it is not intended that the present disclosure be limited to these specific implementations. Numerous other and further derivatives or substitutions which are apparent to those skilled in the art without departing from the concept of the disclosure will be considered as falling into the scope of the disclosure.

What is claimed is:

1. A media processing method, comprising:
in a media file, describing position change information or position information and position change information of a user; and
processing the media file to determine a video to be played;
wherein media samples included in a media track in the media file corresponds to the position change information or the position information and the position change information of the user;
wherein the position change information of the user corresponding to the media samples included in the media track in the media file comprises:
a difference between a current position of the user and a previous position of the user described according to timed metadata of user position change, which represents the position change information of the user corresponding to the media sample(s) in the period.

2. The media processing method according to claim 1, wherein before describing the position information and/or position change information of the user, the method further comprises:
periodically acquiring the position information of the user.

3. The media processing method according to claim 1, wherein the position information of the user corresponding to the media samples included in the media track in the media file comprises:
the position information of the user in any period described according to timed metadata of user position tracing, which represents the position information of the user corresponding to the media sample(s) in the period.

4. The media processing method according to claim 1, wherein the position information of the user corresponding to each media sample is represented according to a position trace data box.

5. The media processing method according to claim 1, wherein the position change information of the user corresponding to each media samples is represented according to a position change data box.

6. The media processing method according to claim 1, wherein
the position information includes at least one of a viewing position or a viewing direction of the user, or,
the position change information correspondingly includes at least one of change information of the viewing position and change information of the viewing direction of the user,
wherein the viewing position includes coordinate(s) of the user's position in a global coordinate system and/or a position of the user determined by a GPS system.

7. The media processing method according to claim 6, wherein the viewing direction includes orientation of a viewpoint of the user in the global coordinate system.

8. The media processing method according to claim 1, wherein processing the media file to determine the video to be played comprises:
determining a current position of the user according to the position information and/or position change information of the user; and
reconstructing/rendering the video to be played according to the current position of the user.

9. The media processing method according to claim 8, wherein after reconstructing/rendering the video to be played according to the current position of the user, the method further comprises:
describing the reconstructed/rendered video to be played according to a media file format.

10. A media processing device, comprising:
a position description module, configured to describe position change information or position information and position change information of a user in a media file; and
a video processing module, configured to process the media file to determine a video to be played;
wherein media samples included in a media track in the media file corresponds to the position change information or the position information and the position change information of the user;
wherein the position change information of the user corresponding to the media samples included in the media track in the media file comprises:
a difference between a current position of the user and a previous position of the user described according to timed metadata of user position change, which represents the position change information of the user corresponding to the media sample(s) in the period.

11. A media processing system, the media processing system comprising a media processor, a sensor, a display, and a communication bus, wherein
the communication bus is configured for connection communication among devices; and
the media processor is configured to execute at least one computer program to control the sensor and the display to implement the media processing method according to claim 1.

12. A non-transitory computer-readable non-volatile storage medium, wherein the non-transitory computer-readable non-volatile storage medium stores at least one computer program which is executable by at least one processor to implement the media processing method according to claim 1.

* * * * *